US008879995B2

(12) United States Patent
Viglione et al.

(10) Patent No.: US 8,879,995 B2
(45) Date of Patent: Nov. 4, 2014

(54) WIRELESS POWER TRANSMISSION USING PHASED ARRAY ANTENNAE

(75) Inventors: Louis Viglione, St. Leonard (CA); Dino Mason, Cambridge (CA); Paolo Primiani, Laval (CA)

(73) Assignee: Viconics Electronics Inc., St-Leonard (CA)

( * ) Notice: Subject to any disclaimer, the term of this patent is extended or adjusted under 35 U.S.C. 154(b) by 576 days.

(21) Appl. No.: 12/645,685

(22) Filed: Dec. 23, 2009

(65) Prior Publication Data

US 2011/0151789 A1 Jun. 23, 2011

(51) Int. Cl.
  *H04B 1/00* (2006.01)
  *H04B 7/06* (2006.01)

(52) U.S. Cl.
  CPC ................ *H04B 7/0682* (2013.01)
  USPC ........ 455/42; 455/41.1; 455/41.2; 455/127.1; 455/25; 455/73

(58) Field of Classification Search
  USPC .................. 455/41.1, 41.2, 42, 25, 73, 127.1; 375/308, 269, 273, 323
  See application file for complete search history.

(56) References Cited

U.S. PATENT DOCUMENTS

| | | | |
|---|---|---|---|
| 5,343,173 A | 8/1994 | Balodis et al. | |
| 5,848,054 A | 12/1998 | Mosebrook et al. | |
| 6,312,426 B1 | 11/2001 | Goldberg et al. | |
| 6,508,815 B1 | 1/2003 | Strul et al. | |
| 6,687,487 B1 | 2/2004 | Mosebrook et al. | |
| 7,074,217 B2 | 7/2006 | Strul et al. | |
| 7,106,261 B2 | 9/2006 | Nagel et al. | |
| 7,362,285 B2 | 4/2008 | Webb et al. | |
| 8,106,825 B1 * | 1/2012 | Wangsness | 342/368 |
| 2003/0156060 A1 * | 8/2003 | Revankar et al. | 342/372 |
| 2006/0192711 A1 | 8/2006 | Haskell | |
| 2006/0281435 A1 | 12/2006 | Shearer et al. | |
| 2007/0010295 A1 | 1/2007 | Greene et al. | |
| 2007/0178645 A1 | 8/2007 | Cook et al. | |
| 2007/0183531 A1 * | 8/2007 | Ahmed et al. | 375/297 |
| 2008/0014892 A1 * | 1/2008 | Aldana | 455/277.1 |
| 2008/0036679 A1 | 2/2008 | Webb et al. | |
| 2008/0042907 A1 | 2/2008 | Webb et al. | |
| 2008/0042914 A1 | 2/2008 | Webb et al. | |
| 2008/0051043 A1 | 2/2008 | Greene et al. | |

(Continued)

OTHER PUBLICATIONS

Jones et al., "Simple radio-frequency power source for ion guides and ion traps", Department of Chemistry, University of Utah, Salt Lake City, Utah, American Institute of Physics, Sep. 1997.

(Continued)

*Primary Examiner* — Temesgh Ghebretinsae
*Assistant Examiner* — MD Talukder
(74) *Attorney, Agent, or Firm* — Norton Rose Fulbright Canada LLP

(57) ABSTRACT

A remote device powering module, system and method for providing RF power to an electronic device located in a bounded area. The remote device powering module comprises a phased array antenna and is connected to a source to convert the power to an electric signal and to apply a phase reference to the electrical signal. The electrical signal is shifted with a shifting module and phased array antenna that comprises a plurality of radiating elements generates and transmits RF power via RF waves using the phase reference and the shifted phase. The RF power is then converted by the receiver to direct-voltage to be provided to the electronic device.

17 Claims, 20 Drawing Sheets

(56) References Cited

U.S. PATENT DOCUMENTS

| | | | |
|---|---|---|---|
| 2008/0054638 A1 | 3/2008 | Greene et al. | |
| 2008/0054729 A1 | 3/2008 | Greene et al. | |
| 2008/0068126 A1 | 3/2008 | Johnson et al. | |
| 2008/0211717 A1* | 9/2008 | Boeck et al. | 342/377 |
| 2008/0212711 A1* | 9/2008 | Auranen et al. | 375/295 |
| 2008/0254752 A1* | 10/2008 | Oh et al. | 455/83 |
| 2009/0117872 A1* | 5/2009 | Jorgenson et al. | 455/334 |
| 2009/0233545 A1* | 9/2009 | Sutskover et al. | 455/25 |
| 2009/0303126 A1* | 12/2009 | Jain et al. | 342/368 |
| 2010/0003036 A1* | 1/2010 | Kuwata et al. | 398/183 |
| 2010/0098435 A1* | 4/2010 | Akiyama | 398/188 |
| 2010/0112943 A1* | 5/2010 | Chia et al. | 455/41.2 |
| 2010/0184371 A1* | 7/2010 | Cook et al. | 455/41.1 |
| 2010/0259447 A1* | 10/2010 | Crouch | 342/374 |
| 2010/0261440 A1* | 10/2010 | Corman et al. | 455/91 |
| 2011/0050166 A1* | 3/2011 | Cook et al. | 320/108 |
| 2011/0076952 A1* | 3/2011 | Chen | 455/42 |
| 2011/0151789 A1* | 6/2011 | Viglione et al. | 455/42 |

OTHER PUBLICATIONS

Wahby, Riad Samir, Radio Frequency Rectifiers for DC-DC Power Conversion, S.B., Massachusetts Institute of Technology (2002), Department of Electrical Engineering and Computer Science, May 20, 2004.

International Search Report dated Mar. 22, 2011 issued by the International Bureau (WIPO) in connection with the corresponding International patent application No. PCT/CA2010/001962.

* cited by examiner

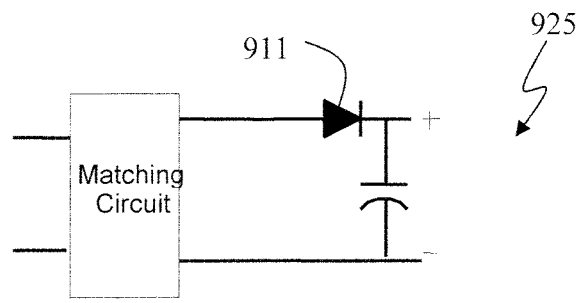
FIGURE 15
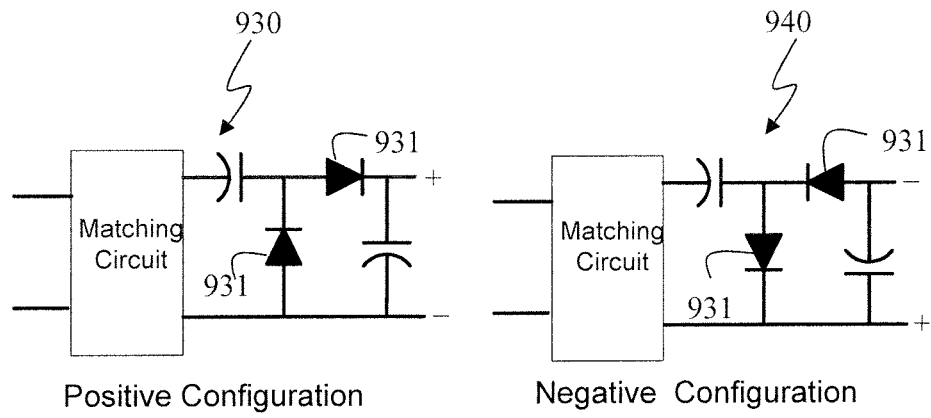
Positive Configuration
FIGURE 16A
Negative Configuration
FIGURE 16B

WIRELESS POWER TRANSMISSION USING PHASED ARRAY ANTENNAE

CROSS-REFERENCE TO RELATED APPLICATIONS

This is the first application filed for the present invention.

TECHNICAL FIELD

The invention relates to the wireless transmission of power between a transmitter and a receiver.

BACKGROUND

Electronic devices are usually directly wired through a commercial or residential electrical wiring infrastructure, through an electrical power cord, AC adapter or the like. As they are permanently installed, the repositioning of these devices is challenging.

To provide mobility, many portable or handheld devices are powered by conventional or rechargeable batteries. However, the use of batteries often requires increasing the size of an electronic device to allow batteries to be inserted. To alleviate this problem some very low power devices are solar powered, but this requires that a user expose the device to solar energy that may not be available when necessary. Battery powered devices require replacement of the battery.

Consequently, there is a need further to develop wireless energy transmission to be used for energy harvesting to power electronic devices.

SUMMARY

In accordance with a first broad aspect, there is provided a remote device powering module adapted to be connected to a source for providing power via Radio Frequency (RF) waves to an electronic device located in a bounded area, the device comprising: a transmitter comprising: at least one connector for providing an electrical connection with the power source; a conversion circuit for converting power from the source to an electrical signal having a reference phase; a phase shifter module for shifting the reference phase of the electrical signal; and a phased array antenna mounted to the transmitter and having a plurality of radiating elements adapted to transmit the electrical signal at a plurality of phases.

In accordance with a second broad aspect, there is provided a method for providing power from a source to an electronic device located in a bounded area, the method comprising: converting power from the source to an electrical signal; generating at least two electrical signals, the at least two signals having a reference phase; shifting a phase of at least one of the at least two signals and sending the at least two signals to at least two radiating elements of a phased array antenna; and transmitting RF power from the phased array antenna to the electronic device, the RF power being transmitted via RF waves.

In accordance with a third broad aspect, there is provided a system for providing power via Radio Frequency (RF) waves from a source to an electronic device located in a bounded area, the system comprising: a remote device powering module adapted to be connected to the source, the device comprising: a transmitter comprising: at least one connector for providing an electrical connection with the power source; a conversion circuit for converting power from the source to an electrical signal having a reference phase; a phase shifter module for shifting the reference phase of the electrical signal; a phased array antenna mounted to the transmitter and having a plurality of radiating elements adapted to transmit the electrical signal at a plurality of phases; and a receiver connected to the electronic device for detecting the RF power and converting the RF power to direct current (DC) to be provided to the electronic device.

Reference will be made throughout the description to a bounded area, which is a space that comprises determined limits to transmit RF power via RF waves between a transmitter and a receiver and should not be construed as an area that is physically bound by walls or other physical barriers.

BRIEF DESCRIPTION OF THE DRAWINGS

Further features and advantages of the present invention will become apparent from the following detailed description in conjunction with the appended drawings, in which:

FIG. 15 is a schematic diagram of an RF detector in accordance with an embodiment;

FIGS. 16A, 16B and 16C are schematic diagrams of voltage multipliers; and

DETAILED DESCRIPTION

Figure 1:
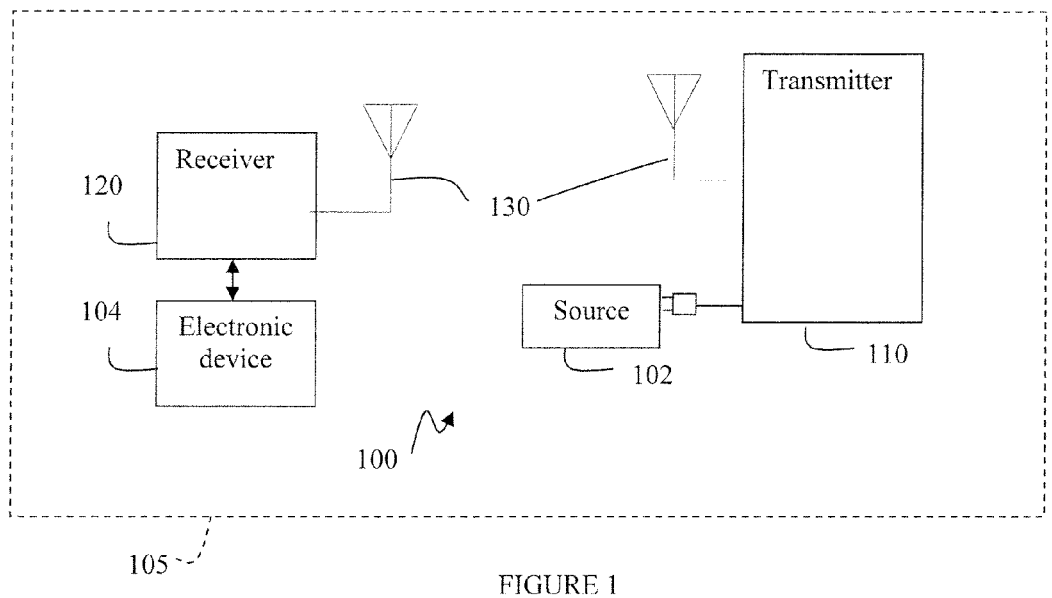
FIG. 1 is a block diagram of a system for providing wireless RF power to an electronic device in a bounded area in accordance with the prior art.

Reference is now made to FIG. 1, which is a block diagram of a system 100 for providing wireless power from a source to an electronic device 104 in a bounded area 105 in accordance with the prior art. The system 100 comprises a transmitter 110 for transmitting RF power to a receiver 120. Both the transmitter 110 and the receiver 120 comprise antenna 130. The system 100 is a conventional system in which RF power can be transmitted from a transmitter 110 to a receiver 120 within an area 105.

Figure 2:
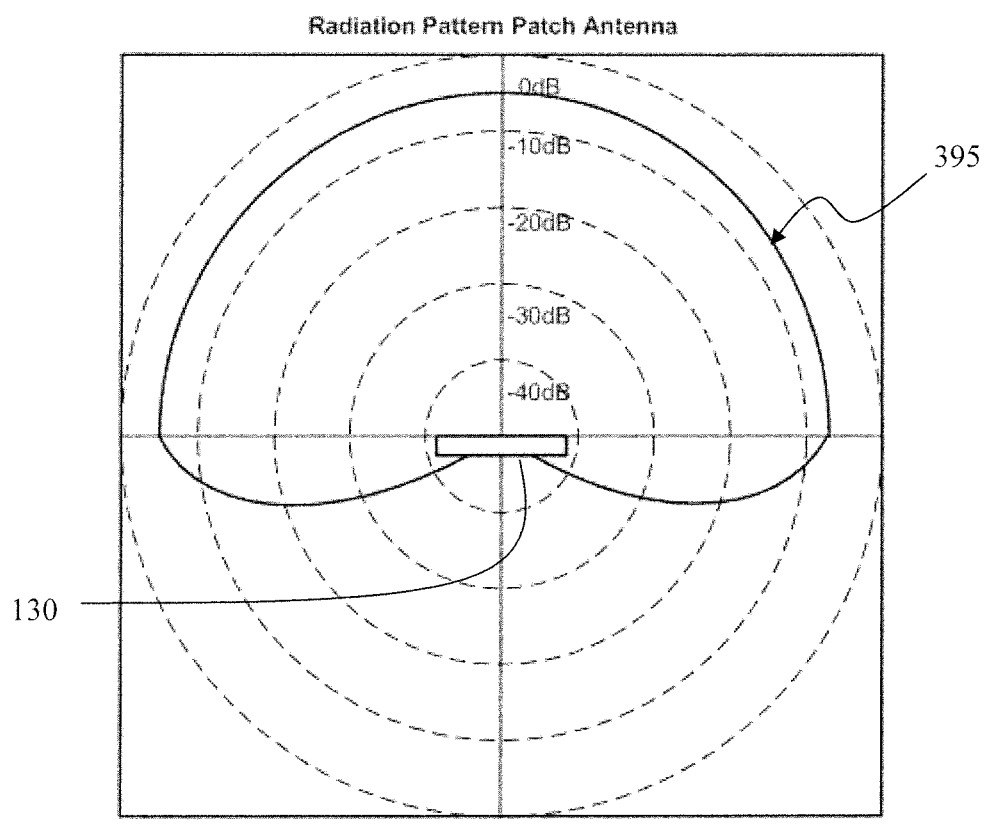
FIG. 2 is a diagram representing the RF power signal emitted by a standard antenna in accordance with the prior art.

Referring to FIG. 2, a uniformly distributed radiation pattern 395 is emitted by the radiating element 130. The uniformly distributed radiation pattern 395 is a conventional radiation.

Figure 3:
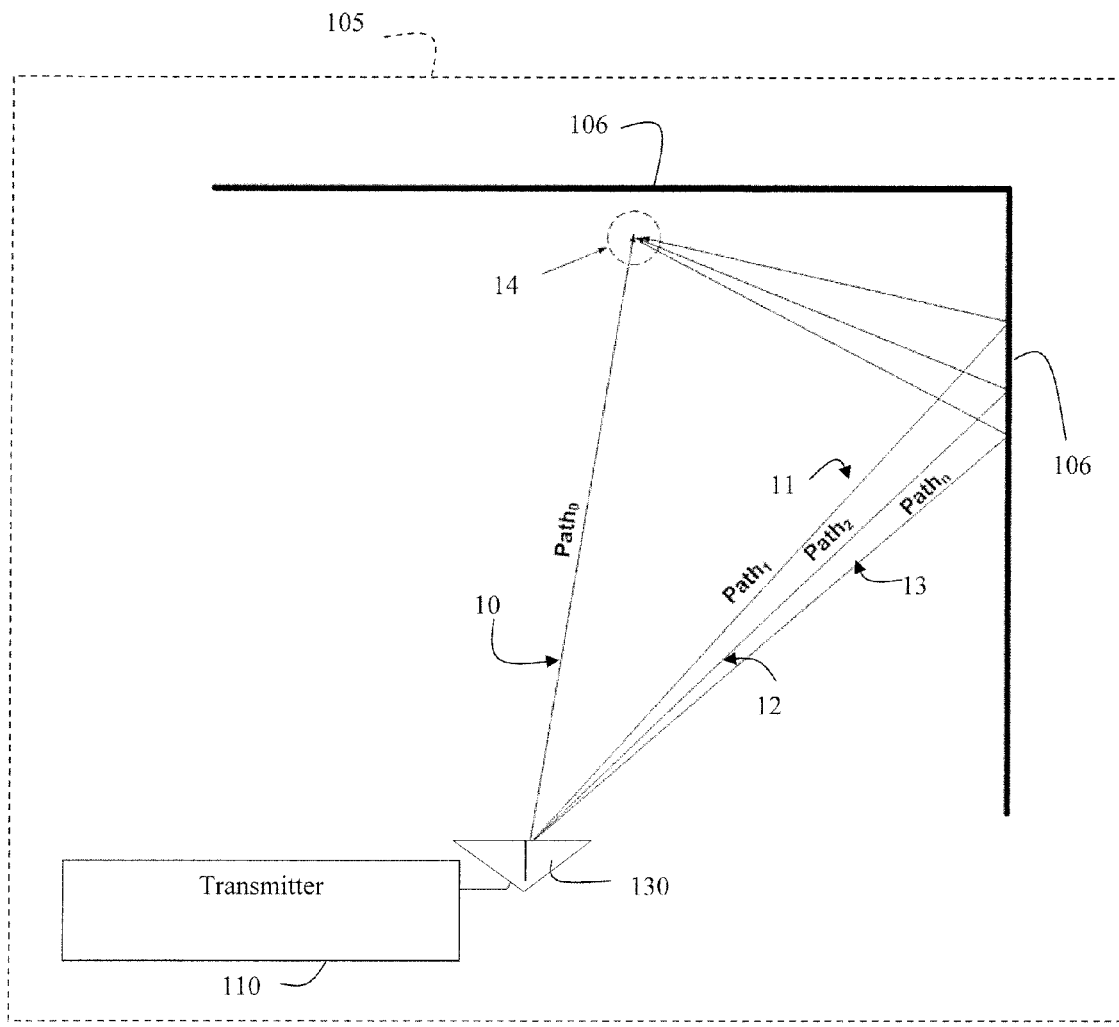
FIG. 3 is a block diagram of the transmission of an RF power signal in the bounded area of FIG. 1.

Referring to FIG. 3, area 105 comprises obstacles 106 (such as walls, furniture, etc), which cause nulls and reflection points. The transmitter 110 transmits RF power, for example, along paths 10-13. During transmission of the RF power, reflection of the RF power on the obstacles 106 creates a constructive reflection point or a destructive null in an area 14. The area 14 cause the RF power transmitted from the transmitter 110 to be altered or blocked, and thus results in a loss of wireless power.

The signal strength at any location of bounded area 105 can be found using:

$$s = s(P_0) + \sum_{n=1}^{\infty}\left(S(P_n)\sin\left(2\pi F \frac{Path_n}{c}\right)\right) \quad (1)$$

Where:
F=frequency of the transmitter in Hz;
Path is in meters;
C=speed of light ($3*10^8$ m/s)
$S(P_0)$ is the signal strength of the RF power signal sent directly to area 14; and
$S(P_n)$ is the signal strength of RF power signal due to reflection and RF path loss on each path $P_n$.

Figure 4:
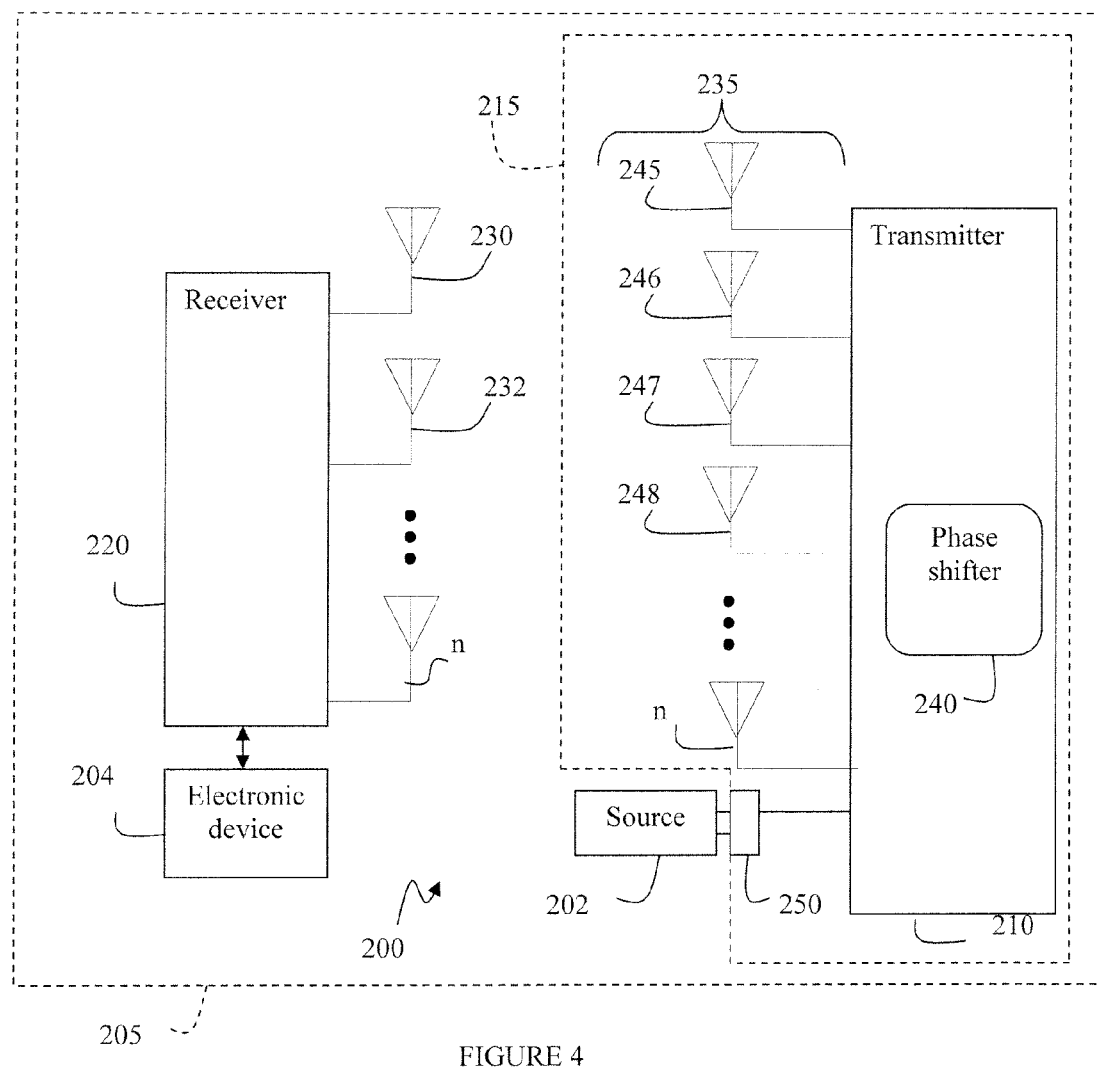
FIG. 4 is a block diagram of a system for providing wireless RF power to an electronic device in a bounded area in accordance with an embodiment.

Reference is now made to FIG. 4, which is a block diagram of a system 200 for providing wireless RF power from a source 202 to an electronic device 204 in a bounded area 205 according to an embodiment. The source 202 can be a main building electrical circuit or any type of other power such as battery source. The electronic device 204 may be any small device such as sensors to detect, for example, movement, temperature, humidity, etc. The device 204 may comprise actuators like switches, relays, solenoids and motors. The device 204 can also be a remote control, a clock, a smoke detector, an intrusion detection, etc. The system 200 can be any electrical system such as an aeronautical system, an automobile system, a cellular system, an office in a commercial building, a room in a residential building, etc, where transmitters are used as controllers to transmit wireless RF power to a receiver of an electronic device.

The system 200 comprises a transmitter 210 for transmitting RF power to a receiver 220. The transmitter 210 and the receiver 220 comprise radiating elements 230, 232 and 245-248. The radiating elements 245-248 can also be referred to as ferromagnetic RF antennae. The area 205 can be any vehicle, room or other open area that may comprise nulls and reflecting points that cause the RF power signal sent from the transmitter 210 to the receiver 220 to be altered or blocked, and thus causing loss of RF power.

The transmitter 210 can be any device for intentionally generating RF waves of RF power. The transmitter 210 can be a communication device capable of two-way communication with the receiver 220. The transmitter 210 may use known wireless technologies such as Zigbee, Wi-Fi, and Bluetooth to provide, for example, redundancy check, data transmission and seamless integration with communication networks such as Internet, computer networks, Local Area Networks (LANs), Wide Area Networks (WANs), Metropolitan Area Networks (MANs) and others. Using phased array technologies can allow the transmitter 210 to aim a beam towards a required location to optimize radio transmission and reception.

FIG. 4 shows a phased array antenna 235 mounted to the transmitter 210. The combination of the phased array antenna 235 and the transmitter 210 constitutes a remote device powering module 215. The phased array antenna 235 comprises radiating elements 245-248 for transmitting RF power from the source 102 via the transmitter to the receiver 220, and a plurality of radiating elements can be part of the phased array antenna 235.

The transmitter 210 comprises a phase shifter module 240 for shifting the phase of a signal which is then fed to the antennae. The phase shifter module 240 allows radiation emitted from the antennae to produce a radiated pattern, which causes constructive radiation intensity in desired direction and destructive radiation intensity in undesired direction. The phase shifter module 240 is a combination of hardware and software parts that calculate a phase shift increment $\Delta\phi$ between radiating elements of the phased array antenna 235 that are neighbors. For example, it would be possible to determine the $\Delta\phi$ between radiating element 245 and radiating element 246, between radiating element 247 and radiating element 248, etc. In another embodiment, the phase shifter module 240 can also be manually or automatically modified to obtain the phase shift increment $\Delta\phi$ between two neighboring radiating elements.

Figure 5A:
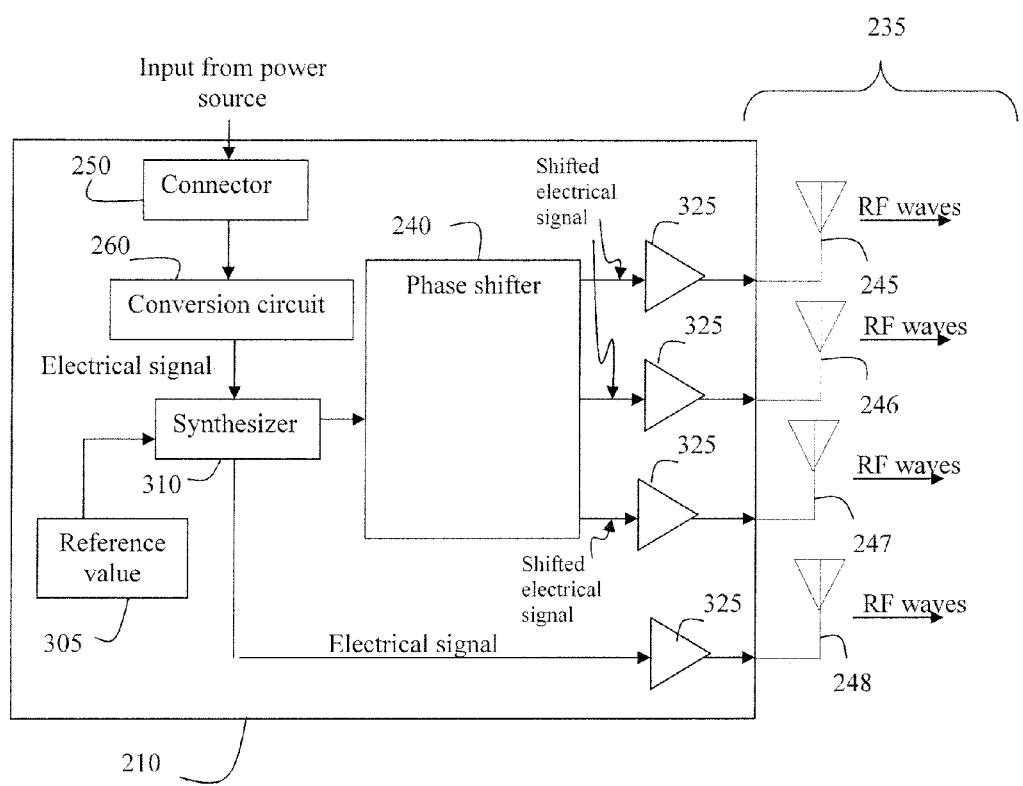
FIG. 5A is a block diagram of a transmitter having a phased array antenna equipped with a phase shifter module in accordance with an embodiment.

Reference is now made to FIG. 5A, which is a block diagram of a transmitter 210 equipped with the phase shifter module 240 in accordance with an embodiment. The transmitter 210 comprises a connector 250 for providing an electrical connection with the source 202. The connector 250 may be any electrical plug adaptor, a battery adaptor, or any other type of connector allowing contact between the power source 202 and the transmitter 210. The power is transmitted from the power source 202 via the connector 250 to a conversion circuit 260. The conversion circuit 260 allows the conversion of the power to an electrical signal. The transmitter 210 comprises a synthesizer 310, which can be any device that creates a waveform such as an oscillator. In the illustrated example, the synthesizer 310 generates a frequency to be applied to the electrical signal where the frequency is digitally controlled based on a value of reference 305. The electrical signal is then shifted by the phase shifter module 240. After being shifted by the phase shifter module 240, the electrical signal is amplified by the power amplifiers 325 and transmitted by the radiating elements 245-248 as RF power via RF waves.

Figure 5B:
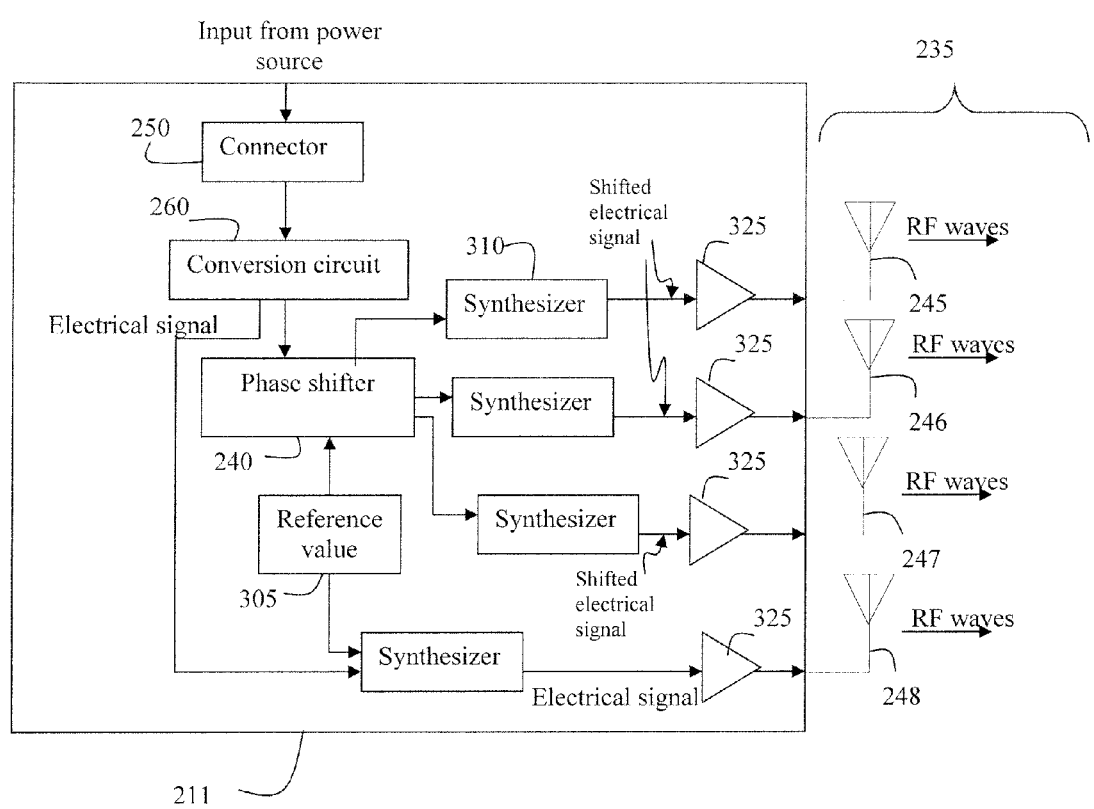
FIG. 5B is a variant of the block diagram of FIG. 5A.

In another embodiment, the phase shifter module 240 can shift the phase from the reference phase before it is sent to the synthesizer 310. As illustrated in FIG. 5B, which is a variant of the transmitter 210, a transmitter 211 uses a synthesizer 310 for each one of radiating elements 245-248, and the phase shifter 240 is then located before the synthesizer 310 to shift the phase.

In the embodiments of FIGS. 5A and 5B, the beam resulting from the radiating elements, at least one of which emits a signal that is shifted in phase, is wider than a beam obtained with radiating elements where the emitted signals have the same phase. Furthermore, in FIGS. 5A and 5B there is shown only one phase shifter module 240, but it is understood that the signal provided to each one of the radiating elements can be shifted with a desired phase shift increment (Δϕ). Alternatively, when the transmitter comprises more than two radiating elements, the Δϕ can be determined for two consecutive or non consecutive radiating elements, as it is described below.

Figure 6A:
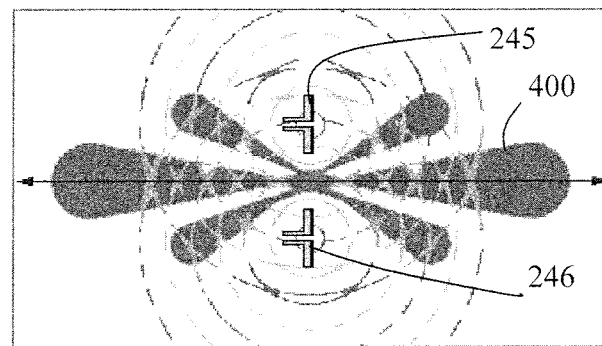
FIG. 6A is a diagram representing the RF power emitted by two radiating dipole antennae in accordance with an embodiment.

Reference is now made to FIG. 6A, which is a diagram representing the RF signal emitted by two radiating elements 245, 246. In FIG. 6A, each of the radiating elements 245, 246 is fed with an electrical signal having the same phase. The electromagnetic signal is amplified by constructive interference in the main direction to obtain a beam 400.

Figure 6B:
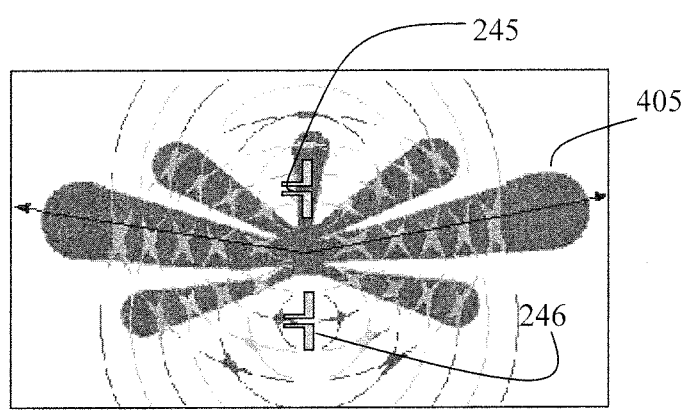
FIG. 6B is a diagram representing the RF power emitted by two radiating dipole antennae where the phase of one of the antennae is shifted in accordance with an embodiment.

Referring now to FIG. 6B, there is shown a beam 405 of a dipole of antennae where radiating element 246 has a phase shifted with respect to radiating element 245, which causes the beam 405 to be shifted upward and to be wider than the beam 400. Therefore, the beam 405 can avoid nulls and dead spots that may otherwise be present in the bounded area 205.

Figure 6C:
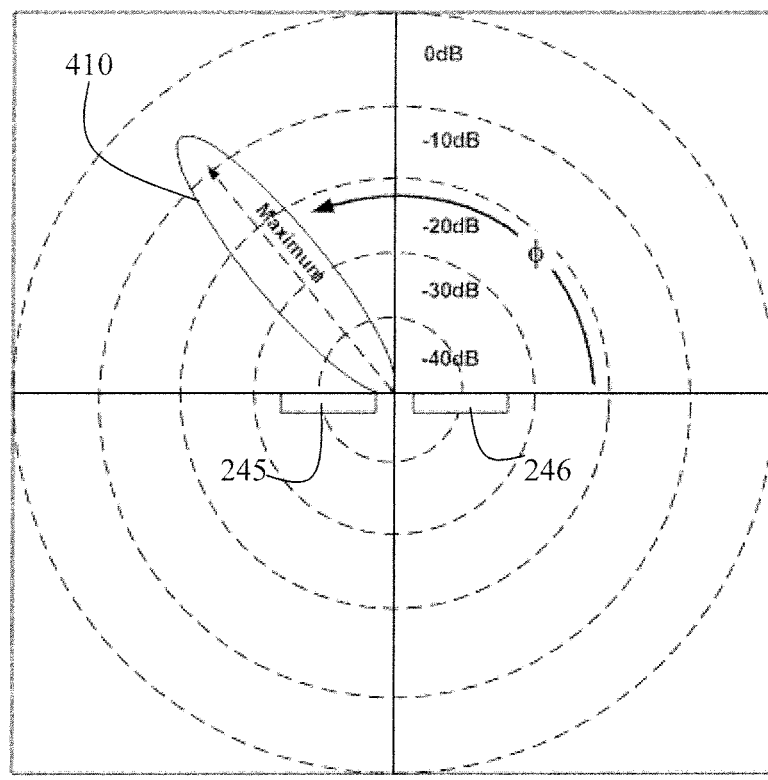
FIG. 6C is a diagram representing the RF power emitted by the radiating dipole antennae where the intensity of the RF signal is concentrated in a small area in accordance with an embodiment.

Referring now to FIG. 6C, there is shown a beam 410 of a pair of dipole antennae, where radiating elements 245 and 246 may each be a dipole antenna. In this embodiment, the beam 410 is directed by the radiating dipole antennae in a specific direction. In this embodiment, the paths of the RF power signal are altered and cause constructive reflections and may reduce the presence of nulls. This may increase the RF power signal intensity at the receiver location and may eliminate RF power signal loss due to reflection. Therefore, as indicated above for beam 405, beam 410 can avoid nulls and dead spots that may otherwise be present in the bounded area 205.

The equation below refers to isotropic radiating elements. The isotropic radiating element is an energy source that radiates uniformly in all direction. The following equation provides the phase shift ϕ between radiating elements:

$$\phi = (360/\lambda) * (d * \sin \Theta_s) \quad (2)$$

Figure 7:
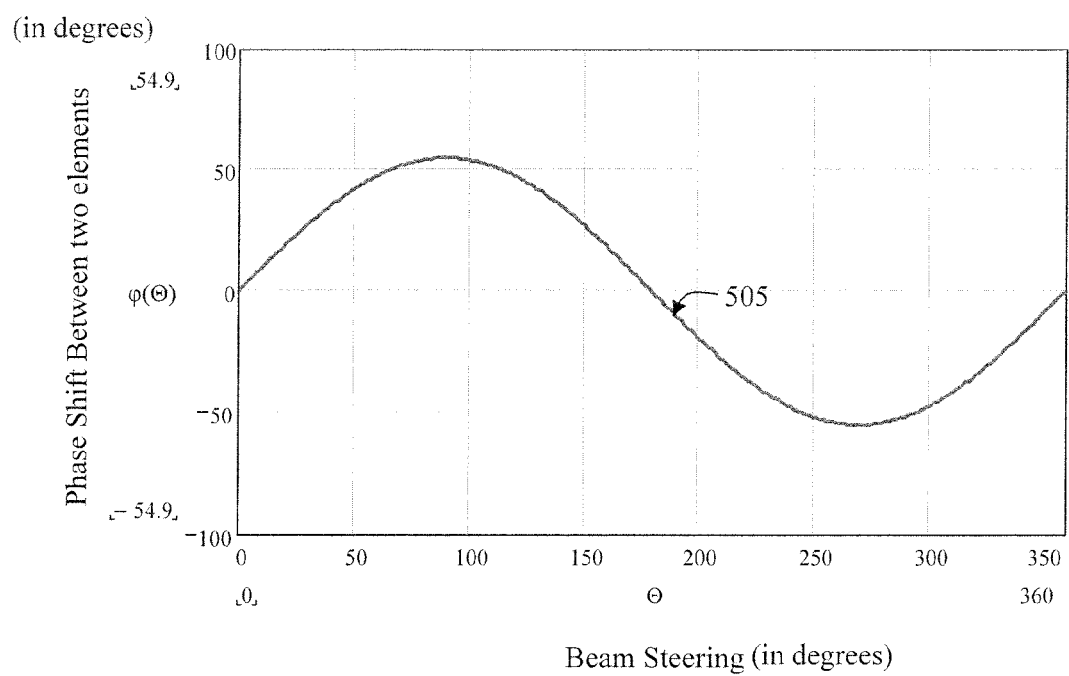
FIG. 7 is a graph representing an example of a shifted phase of a signal in accordance with an embodiment.

Where:
d=distance between the radiating elements
$\Theta_s$=beam steering
λ=wavelength Referring now to FIG. 7, there is shown an example of a shifted phase and the application of the equations listed above. In this example, the distance d is 0.05 m and the wavelength λ is 0.33 m. The curve 505 represents the phase shift of the variation of the electrical signal versus the beam steering in degrees between the radiating elements 245, 246.

Figure 8:
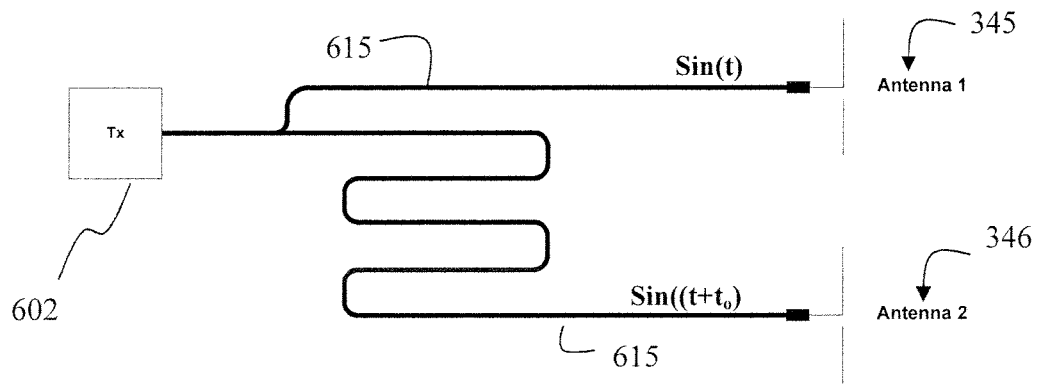
FIG. 8 is a block diagram of a frequency scanning array antenna in accordance with an embodiment.
Figure 9A:
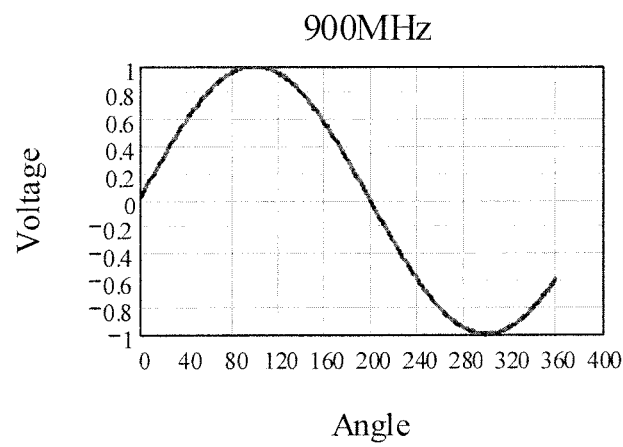
FIGS. 9A-9D are graphical representations of shifted phases using the frequency scanning array antenna of FIG. 6 in accordance with an embodiment.
Figure 9B:
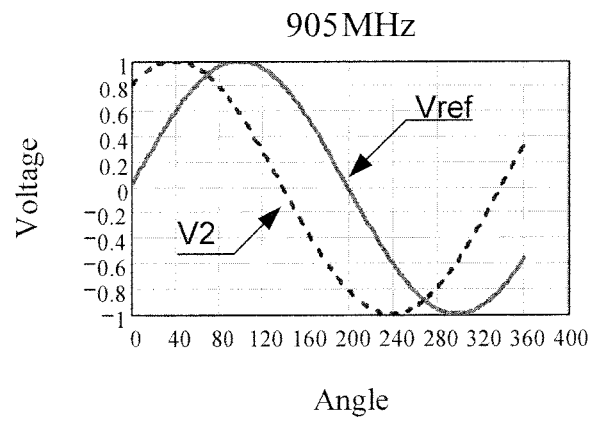
Figure 9C:
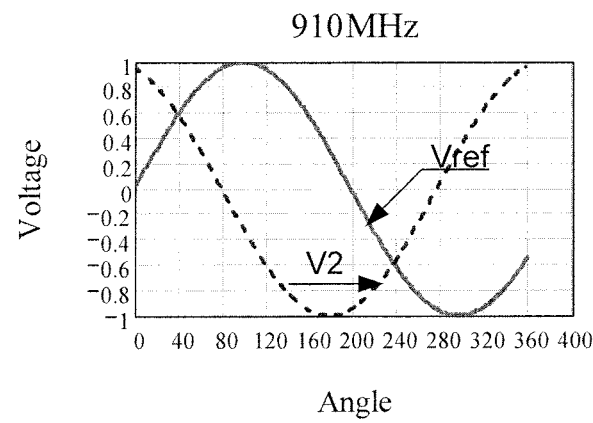
Figure 9D:
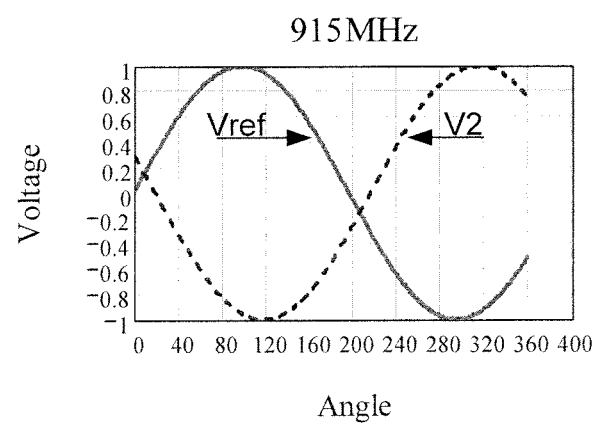

Reference is now made to FIG. 8, which is a schematic illustrating a frequency scanning array configuration. In one embodiment, the beam steering is obtained by changing the phases of the electrical signals provided to the radiating elements. Radiating elements 345, 346 are found at the end of a folded waveguide 615, which acts as a delay line. The transmitter 602 generates a signal, which is sent at a desired frequency through the folded waveguide 615 to radiating elements 345, 346. The folded waveguide 615 shifts the phase of the electrical signal sent to radiating element 346, and beam steering is done proportionally to the transmitted signals (sin(t) and sin($t_0$)) of radiating elements 345, 346. Thus a greater time delay will cause a greater change of the phase of the signal. In another embodiment, the frequency scanning array may comprise more than two radiating elements. In that case, each additional radiating element may be connected to the transmitter 602 through a corresponding waveguide. Doing this adds a cumulative delay $t_0$ for each added radiating element.

FIGS. 9A-9D are graphical representations of shifted phases using the frequency scanning array of FIG. 8 in accordance with an embodiment. The FIGS. 9A-9D show different examples of curves of the electrical signal transmitted to the radiating elements 345 and 346 with different values of frequencies used. In these figures, the RF power curves are obtained using:

$$V_{ref(t)} = \sin[2\pi f t] \quad (3)$$

$$V_{2(t)} = \sin[2\pi f^*(t+t_0)] \quad (4)$$

Figure 10:
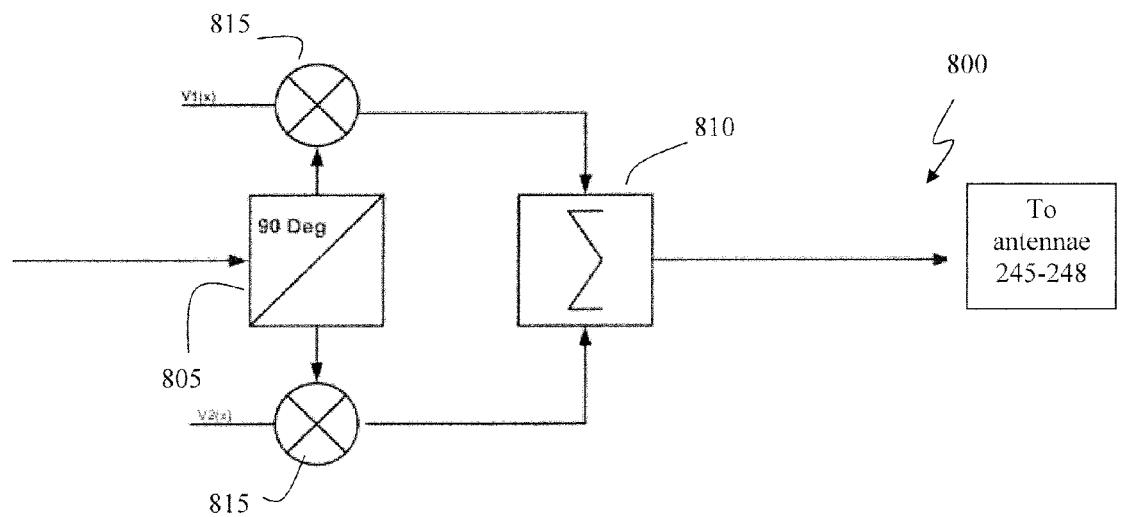
FIG. 10 is block diagram of a vector modulator in accordance with an embodiment.

In another embodiment of the transmitter 210, the phase shifter module 240 can be a vector modulator. Reference is now made to FIG. 10, which is a block diagram of a vector modulator 800 in accordance with an embodiment. The vector modulator 800 comprises a divider 805, a summer 810, and converters 815.

A signal θ(t), which is the reference value of the phase of the RF signal is provided to the divider 805. θ(t) is given by, $$\theta(t) = \sin\left(2\pi F_r \frac{t}{360}\right) \quad (5)$$

Where:
t=time in seconds
$F_r$=frequency of the local oscillator

The phase of θ(t) is then shifted with the divider 805 to obtain θ'(t). The shifted signal θ'(t) is given by:

$$\theta'(t) = \sin\left(2\pi F_r \frac{t}{360} + \frac{\pi}{2}\right) \quad (6)$$

The converters 815 convert the shifted signal θ'(t) with input signal V1(x) to converted signal α(t,x) and the original signal θ(t) with V2(x) to converted signal Φ(t,x). V1(x), V2(x), α(t,x) and Φ(t,x) are given by, $$V1(x) = A_o \sin\left(\frac{2\pi F_r}{360} x\right) \quad (6)$$

$$V2(x) = A_o \cos\left(\frac{2\pi F_r}{360} x\right) \quad (7)$$

$$\alpha(t,x) = V1(x)\theta'(t) = A_o \sin\left(\frac{2\pi F_r}{360} x\right) \sin\left(2\pi F_r \frac{t}{360} + \frac{\pi}{2}\right) \quad (8)$$

$$\phi(t,x) = V2(x)\theta(t) = A_o \cos\left(\frac{2\pi F_r}{360} x\right) \sin\left(2\pi F_r \frac{t}{360}\right) \quad (9)$$

Where:
$A_0$=magnitude
x=time in seconds of the input signals
t=time in seconds of the reference signal The converted signals α(t,x) and Φ(t,x) are combined with the summer 810 into output signal ψ(t,x), which is provided to antennae 245-248. The output signal is given by, $$\psi(t,x) = \alpha(t,x) + \phi(t,x) \quad (10)$$

Figure 11:
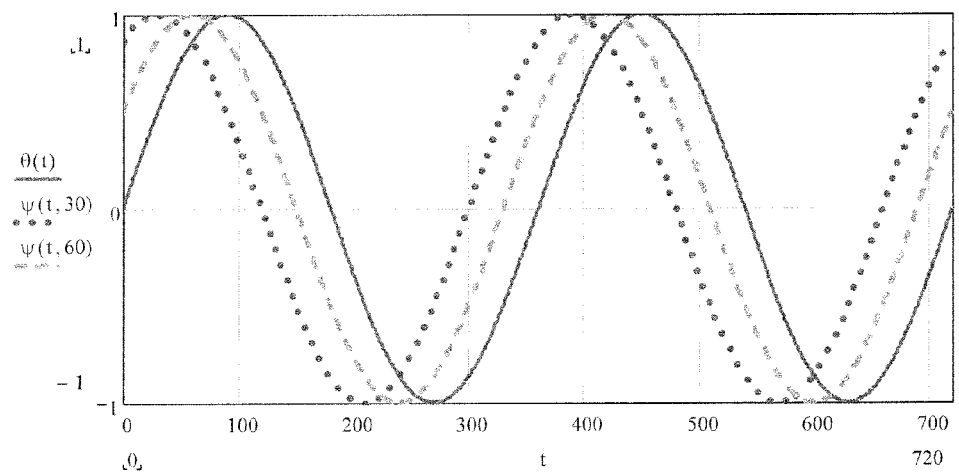
FIG. 11 is a graphical representation of shifted phases using the vector modulator of FIG. 8 in accordance with an embodiment.

Reference is now made to FIG. 11, which is a graphical representation of shifted phases using the vector modulator 800 in accordance with an embodiment.

Figure 12A:
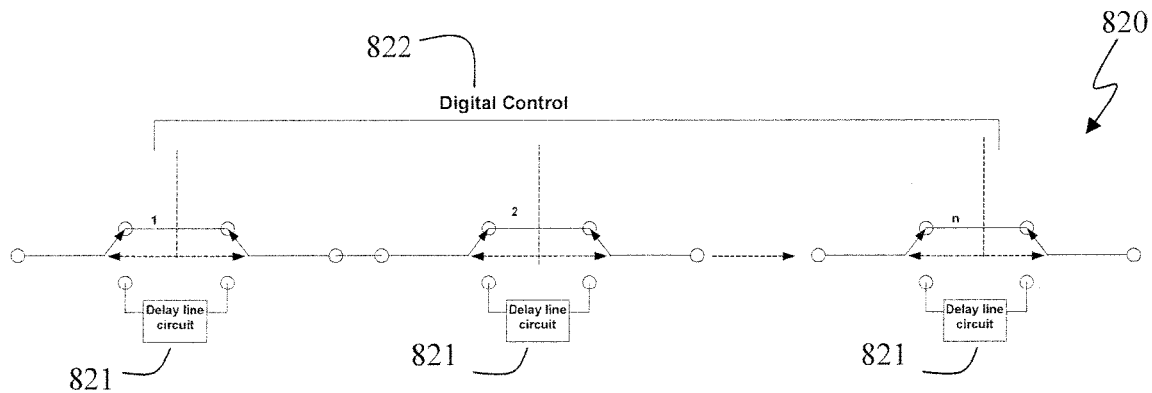
FIGS. 12A-12C are schematic diagrams of phase shift modules in accordance with various embodiments.
Figure 12B:
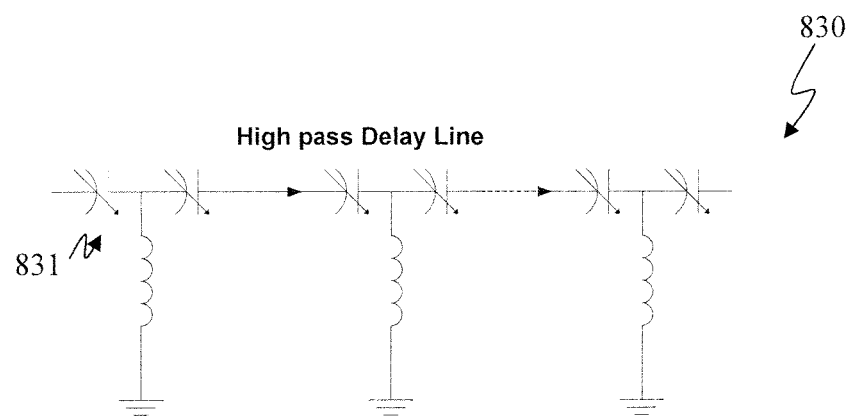
Figure 12C:
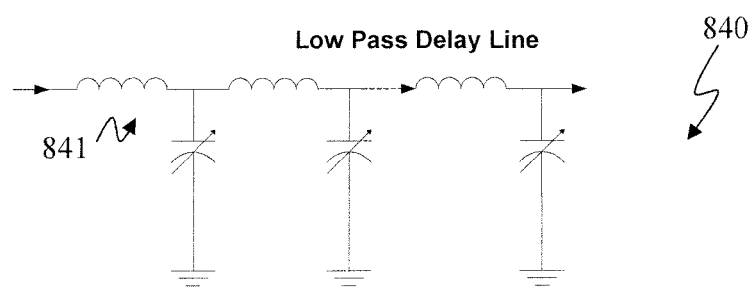

In another embodiment of the transmitter 210, the phase shifter module 240 can be a digital control phase shifter, a linear control phase shifter, a load line phase shifter, a ferroelectric phase shifter, a reflective phase shifter, a Schiffman phase shifter, etc, and can be used in the context of FIG. 5A. Reference is now made to FIGS. 12A-12C, which are schematic diagrams of phase shifter modules in accordance with various embodiments. These phase shifter modules allow the beam to be wider than a beam without a shifted signal. The RF power of a wider beam can then be transmitted even when nulls or dead points are present in the bounded area 205.

In the embodiment of FIG. 12A, the digitally controlled phase shifter consists of a series of delay line circuits 821, which can be switched on/off by a digital control 822. Each delay line circuit 821 can be implemented by a conventional coaxial line. In another embodiment, a micro strip delay line or a lump element such as an inductor capacitor delay line can be used. In another embodiment, a linear control phase shifter using a delay line circuit can be used. The delay line circuit shifts the phase of the signal transmitted to a radiating element. In the embodiment of FIG. 12B, there is shown a linear control phase shifter using a high pass delay line circuit 830. In FIG. 12B, the high pass delay line 830 comprises a series of high pass filters 831. In the embodiment of FIG. 12C, there is shown a linear control phase shifter using a low pass delay line circuit 840. In FIG. 12C, the low pass delay line 840 comprises a series of low pass filters 841.

Figure 13:
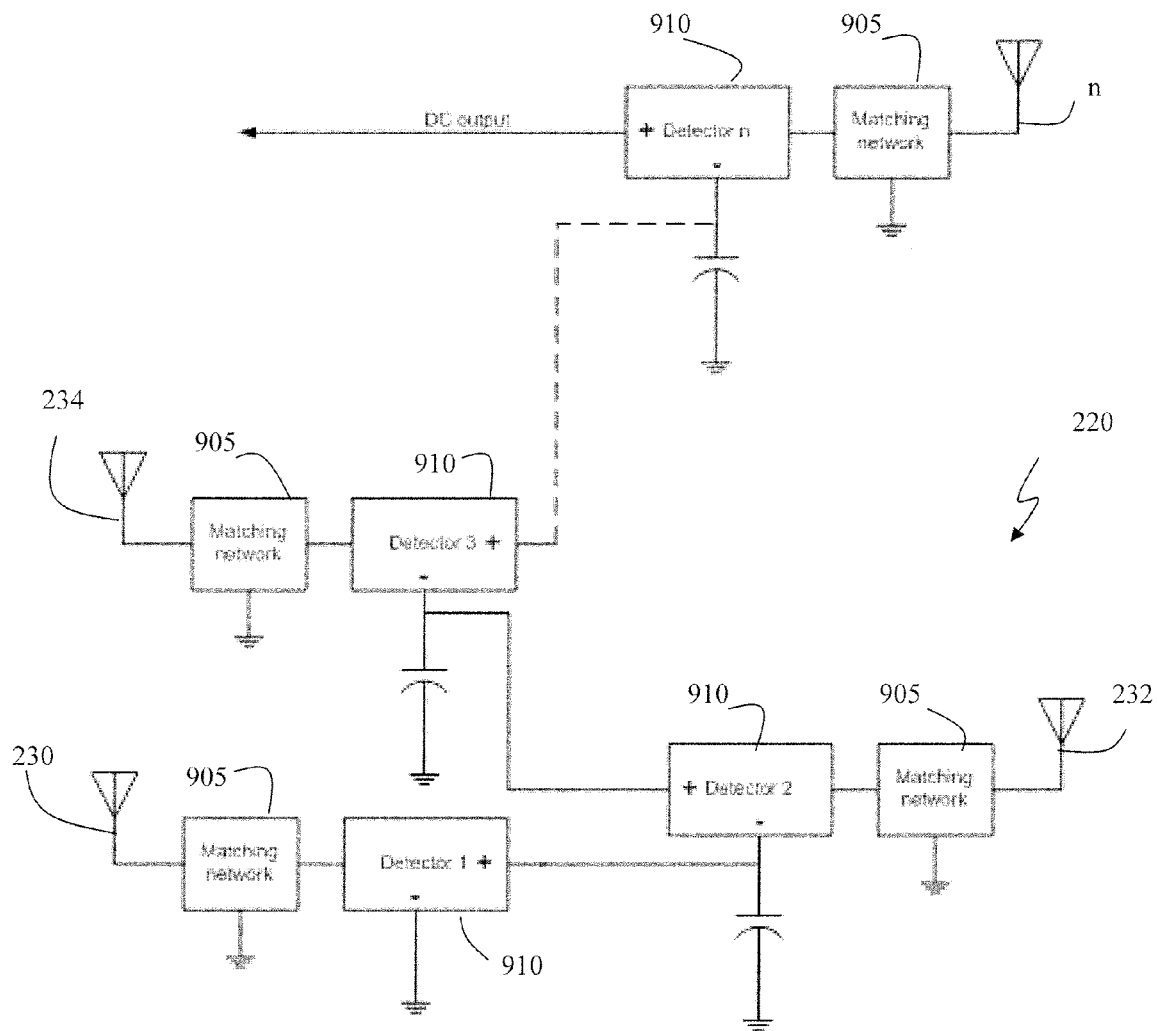
FIG. 13 is a block diagram of a receiver in accordance with an embodiment.

Referring back to FIGS. 5A and 5B, the RF power transmitted by the transmitters 210, 211 is detected by the receiver 220 and conversion to DC voltage occurs. Reference is now made to FIG. 13, which is a block diagram of the receiver 220 in accordance with an embodiment. The receiver 220 can be any device such as a tuner for RF power, a communication device capable of two-way communication with the transmitter 210 using known spread spectrum technologies, etc. The receiver 220 comprises receiving antennae up to n receiving antennae for receiving the RF power, a matching network 905 for transmitting the RF AC voltage to a detector 910. The detector 910 then converts the received RF power to DC voltage.

The dimension and radiated resistance of a receiving antenna are among the parameters which affect the overall performance of the receiver 220. The dimensions are governed mainly by the operating frequency, and the radiated resistance (antenna impedance) will determine the voltage generated by the antenna for a given received RF power. The following formula provides the voltage received by a receiving antenna such as receiving antenna 230.

$$V_r = \sqrt{\frac{10^{dBm_{isotropic}+dB_{Gain}}}{1000} R_r} \quad (11)$$

Figure 14A:
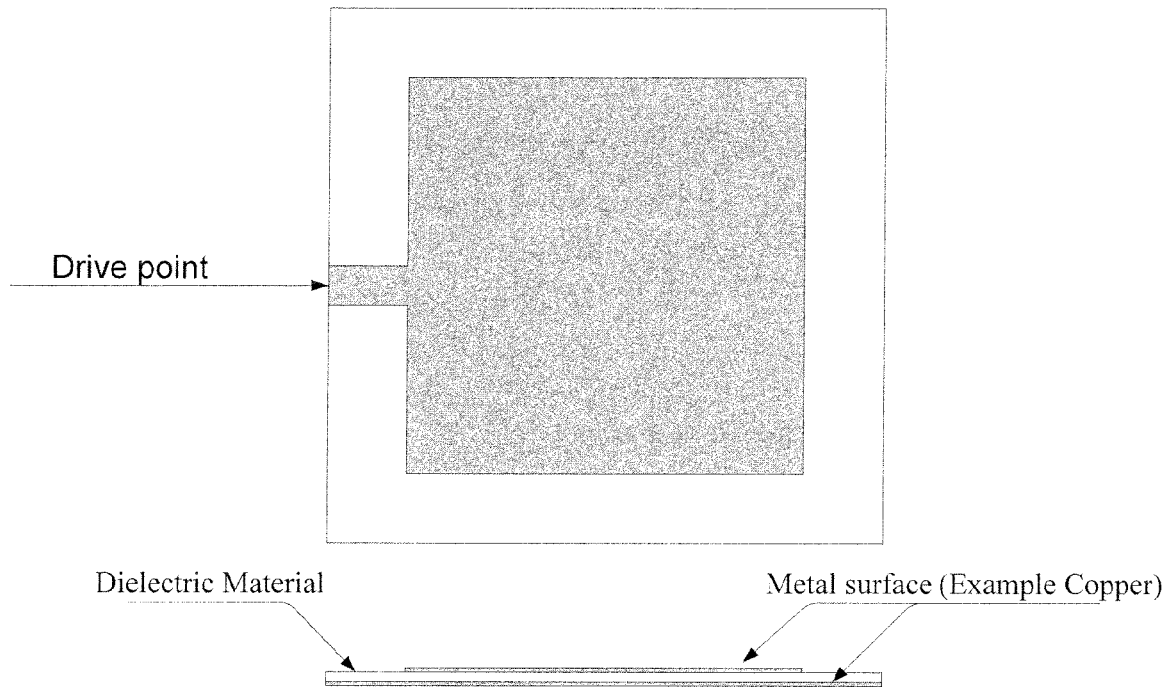
FIGS. 14A, 14B, 14C, and 14D are schematic diagrams of exemplary antennae, in accordance with some embodiments.
Figure 14B:
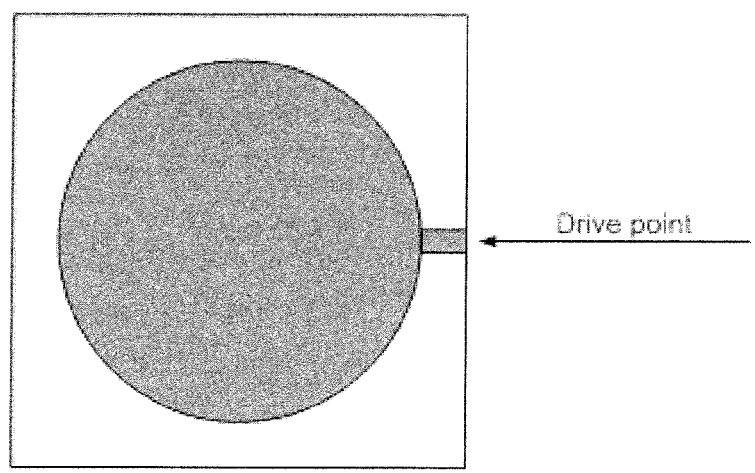
Figure 14C:
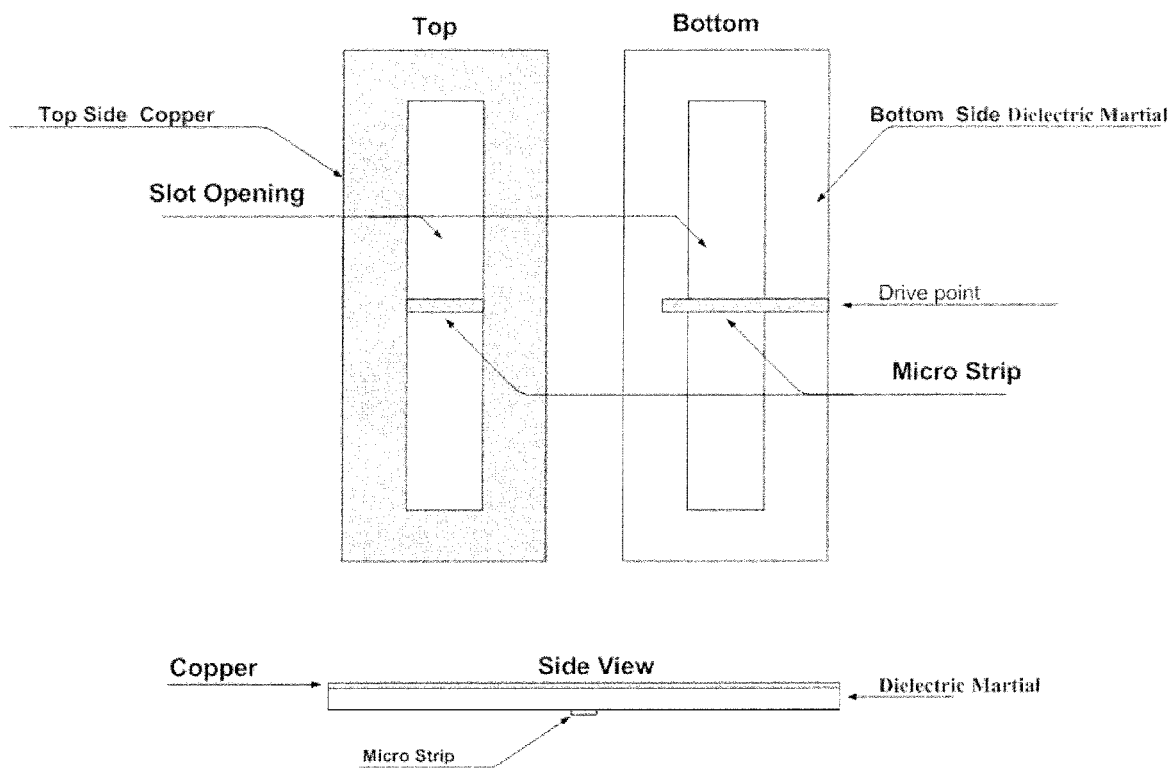
Figure 14D:
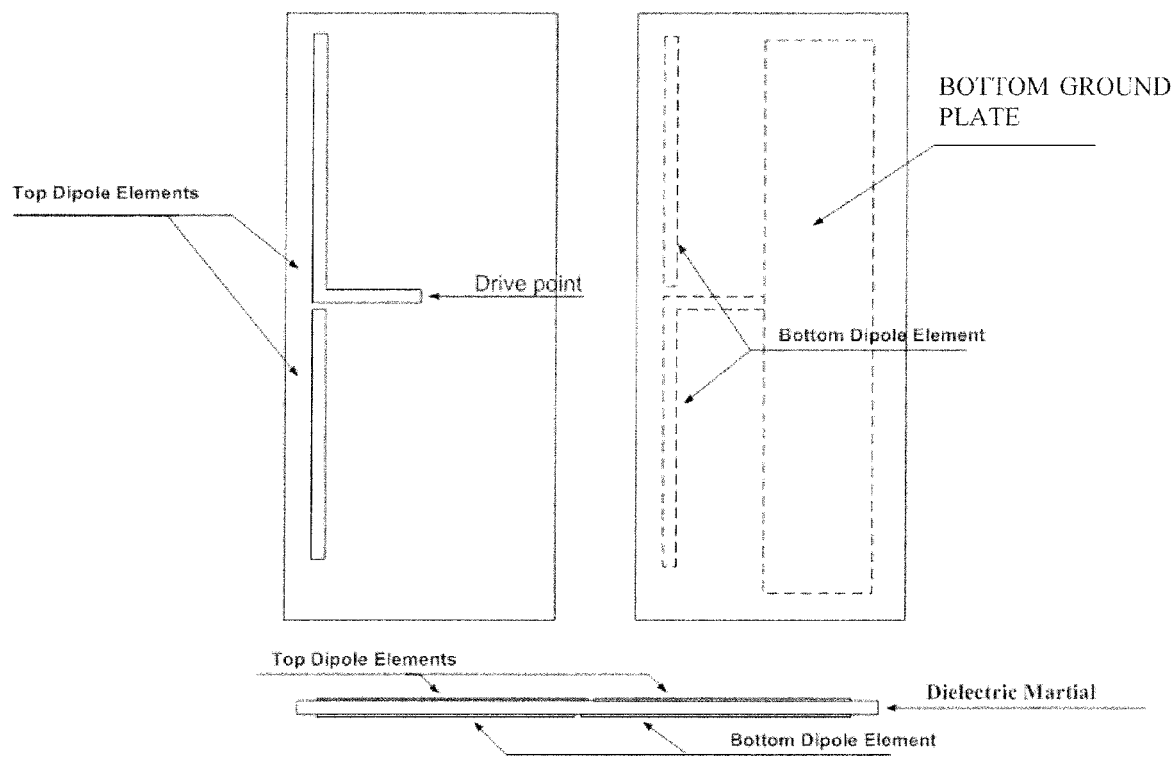

Where:
$dBm_{isotropic}$=power received by an isotropic antenna
$dB_{Gain}$=gain of the antenna used
$R_r$=radiated resistance of the antenna Reference is now made to FIGS. 14A, 14B, 14C and 14D, which are schematic diagrams of antennae that can be used with the receiver 220 for power harvesting in accordance with an embodiment. FIG. 14A illustrates a patch antenna, FIG. 14B illustrates a circular patch antenna, FIG. 14C illustrates a micro-strip slot antenna, and FIG. 14D illustrates a micro-strip dipole antenna. Other types of antennae may also be used, as will be understood by the person skilled in the art.

Reference is now made to FIG. 15, which is a schematic diagram of an RF detector 910 in accordance with an embodiment. As discussed above the RF detector 910 converts the received RF power to DC voltage. The RF power is received as RF Alternative Current (AC) and is converted to DC voltage using a diode 911. After voltage conversion by the RF detector 910, the voltage can be increased with a voltage multiplier. The voltage multiplier receives AC voltage, and converts AC voltage to DC voltage.

Referring to FIG. 16A a voltage multiplier 930 comprises a positive configuration of diodes 931, 932. The voltage multiplier 930 uses the positive configuration of diodes 931, 932 to provide a positive voltage.

Referring to FIG. 16B, a voltage multiplier 940 comprises a negative configuration of diodes 931, 932. The voltage multiplier 940 uses the negative configuration of diodes 931, 932 to provide a negative voltage.

Figure 16C:
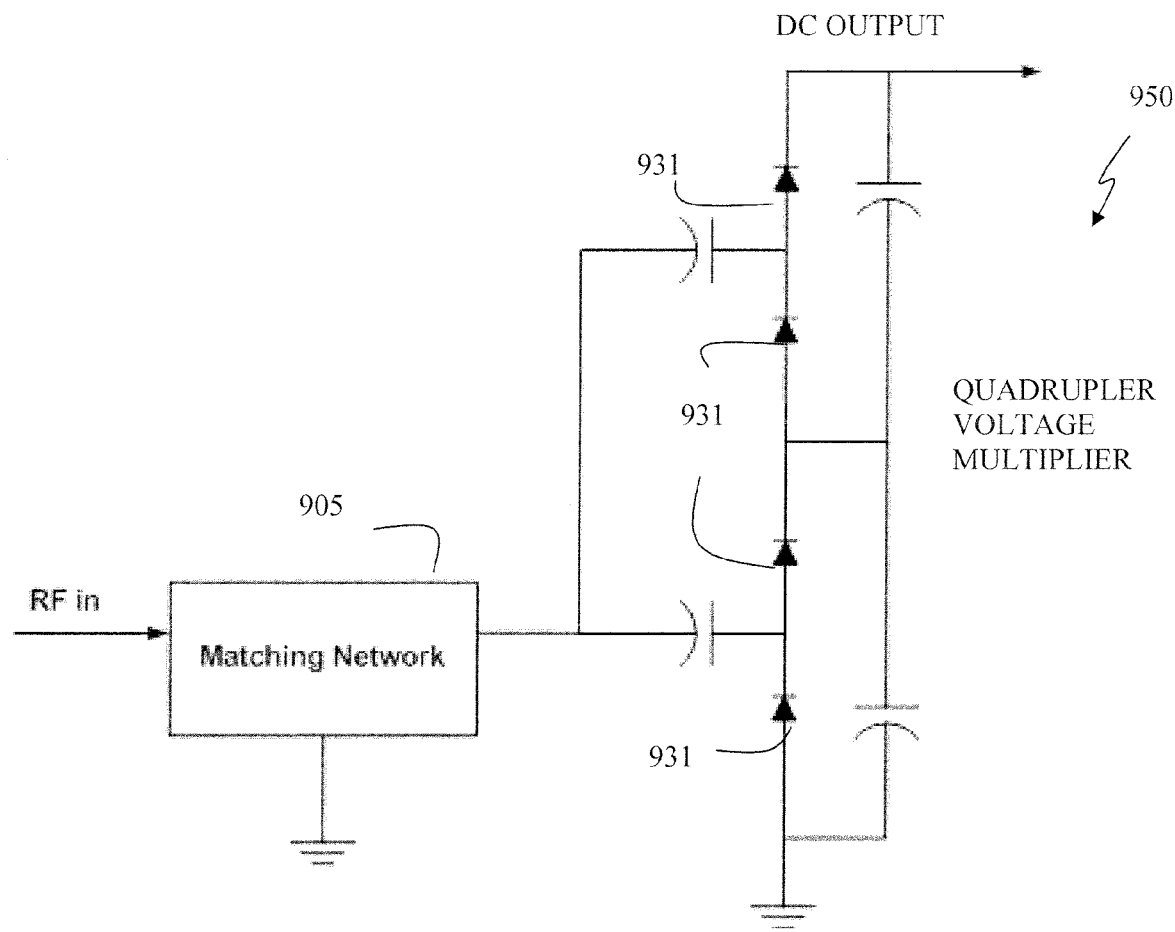

Referring to FIG. 16C, an RF voltage quadrupler detector 950, which comprises a positive configuration of four diodes to provide a positive voltage. Alternatively, the RF Voltage Quadrupler detector 950 can comprise a negative configuration of diodes to provide a negative voltage. The negative configuration is obtained by reversing the direction of each diode.

Figure 17:
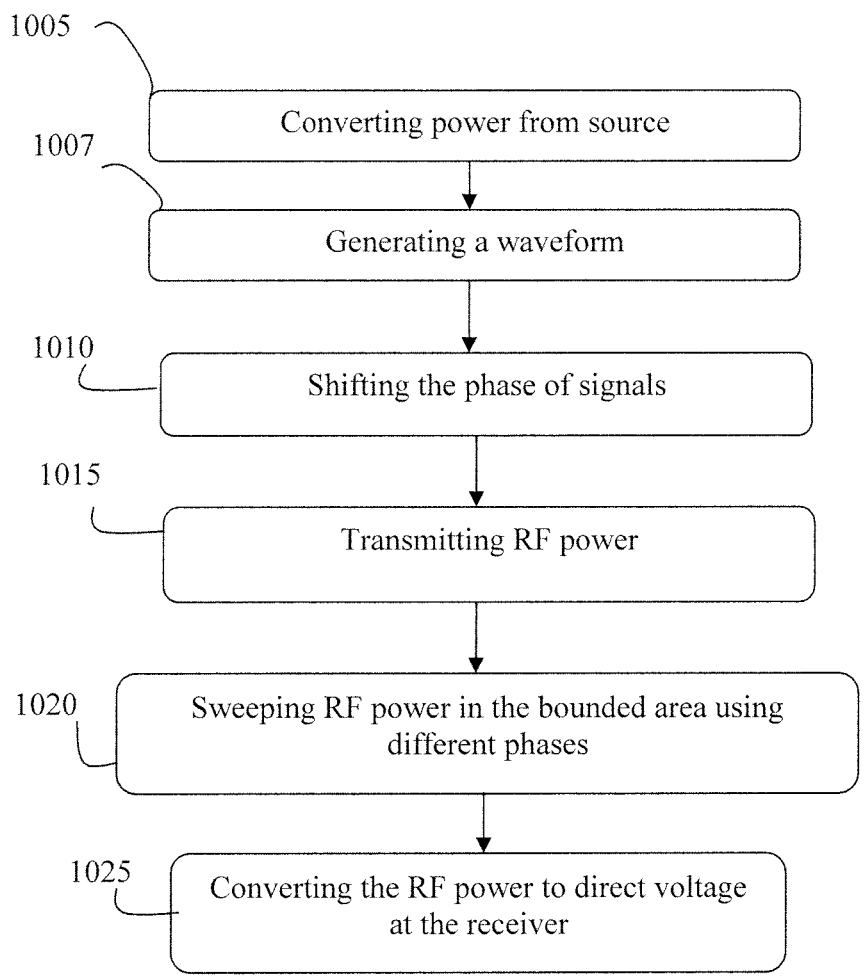
FIG. 17 is a flow chart of a method for providing wireless power using RF waves between a transmitter and a receiver in accordance with an embodiment.

Reference is now made to FIG. 17, which is a flow chart of a method for providing power from the source 202 to the electronic device 204 located in the bounded area 205. According to 1005, the power received from the source 202 is converted to an electrical signal. According to 1007, a waveform is generated. The reference frequency provides the reference phase. According to 1010, the phase is shifted before the signal is transmitted to one radiating element 245-248 of the phased array antenna to generate a rotating beam. According to 1015, RF power is transmitted by the phased array antenna 235 using RF waves. According to 1020, the RF power is transmitted based on the reference phase and the shifted phase. The reference phase and the shifted phase allow the RF power to be sent to nulls and dead points or portions of the bounded area 205 that cause reflection of the RF power. According to 1025, the receiver converts RF power to direct voltage at the receiver.

In another embodiment, the reference phase can be shifted by a phase shifter module before it is sent to the synthesizer 310. In an alternate embodiment, the method for providing power from the source 202 to the electronic device 204 using low power levels may contribute to respect the exposure limit of the human body to RF power.

The exposure limit to the human body is determined by power density mw/cm² for a fixed duration. For 300 MHz to 1500 MHz, the exposure limit is $f_o/1500$ mW/cm² where $f_o$ is the frequency of transmitted energy emitted for a duration of 30 minutes on and 30 minutes off. For 900 MHz frequency band, the exposure is 600 µW/cm². If the power density is below 600 µW/cm2 then the emitted energy can be transmitted continuously. If duty cycle radiated power is present, then the power density can be calculated by, $$\Sigma S_{exp} t_{exp} = S_{Limit} t_{avg} \quad (14)$$

Where:
$S_{exp}$=Power density Level of exposure (mW/cm2)=Power density×Duty Cycle period (Exposure duration is for example 30 minutes on/30 minutes off without regard to duty cycle)
$S_{limit}$=Appropriate power density MPE limit (mW/cm²)
$t_{exp}$=Allowable time of exposure for $S_{exp}$
$t_{avg}$=Appropriate Means Percent Error (MPE) averaging time In yet another embodiment the method for providing power from the source 202 to the electronic device 204 located in the bounded area 205 may eliminate the use of batteries by improving the reliability and costs of the system especially in hard-to-reach location by eliminating the need for replacement of batteries. This may also reduce the size and the weight of the device 204 in applications such as in aeronautics where these parameters are critical.

In an alternate embodiment, the method for providing power from the source 202 to the electronic device 204 can replace solar cells for locations where light is not available or limited in time such as ceiling spaces in HVAC, closets in buildings, etc.

In a further embodiment, the method for providing power from the source 202 to the electronic device 204 may also eliminate cabling in applications where the weight of cables and related structures is inconvenient or where running cables and drilling in walls is not recommended such as in museums, historical buildings, etc. Furthermore, by removing a physical link such as wires, it can be possible to ensure mobility of the device 204. Then the device may not be restricted to a particular location and may not need to be relocated, or can be relocated easily.

In yet another embodiment, a phased array technique permits to adapt power levels to changes in the environment. The technique is used to overcome interference and nulls generated by the introduction of elements and obstacles in the new environment, thus avoiding the relocation of the transmitter 210 or the receiver 220 when changes in environment occur.

Those skilled in the art will understand that the system 200 is not limited to the number of elements shown in FIGS. 4 to 16. For example, the system 200 may comprise more transmitters and receivers. More particularly, it should also be understood that FIGS. 4 to 16 depict simplified hardware and software parts, and that other hardware and software parts may have been omitted for clarity reasons. Those skilled in the art will understand that the hardware parts of the system 200 include processors and electronic parts to execute the method described above. Those skilled in the art will understand that the software parts of the system 200 include instructions and computer code that are executed by the processors and electronic parts to modify the system 200, to generate RF power, to transmit RF power using RF waves between an RF power source and an electronic device, and to convert the RF power to DC voltage.

The embodiments described above are intended to be exemplary only. The scope of the invention is therefore intended to be limited solely by the scope of the appended claims.

The invention claimed is:

1. A remote device powering module adapted to be connected to a source for providing power via Radio Frequency (RF) waves to an electronic device located in a bounded area, the device comprising:
    a transmitter for transmitting RF power to the electric device, the transmitter comprising:
        at least one connector for providing an electrical connection with the power source;
        a conversion circuit for converting power from the source to an electrical signal having a reference phase;
        a phase shifter module for shifting the reference phase of the electrical signal; and
        a phased array antenna mounted to the transmitter and having a plurality of radiating elements adapted to transmit the electrical signal at a plurality of phases, the phase shifter module adapted to determine, prior to transmission of the electrical signal as RF power from the phased array antenna to the electronic device, a phase shift increment between at least a pair of the plurality of radiating elements to cause at least one of a constructive radiation intensity in a first direction and a destructive radiation intensity in a second direction upon radiation being emitted by the plurality of radiating elements, and to apply the phase shift increment to the reference phase of the electrical signal to create a shifted electrical signal provided to at least one of the at least pair of plurality of radiating elements.

2. The device of claim 1, wherein the phase array antenna is a frequency scanning array antenna.

3. The device of claim 2, wherein the transmitter comprises a synthesizer for generating a digital frequency for the electrical signal.

4. The device of claim 3, wherein the phase shifter module is connected to the synthesizer of the transmitter.

5. The device of claim 3, wherein the phase shifter module is a vector modulator.

6. The device of claim 1, wherein the transmitter comprises a plurality of amplifiers.

7. The device of claim 6, wherein each radiating element of the plurality of radiating elements is connected to an amplifier of the plurality of amplifiers.

8. A method for providing power from a source to an electronic device located in a bounded area, the method comprising:
    converting power from the source to an electrical signal;
    generating at least two electrical signals, the at least two signals having a reference phase;
    shifting a phase of at least one of the at least two signals by applying a phase shift increment to the reference phase and sending the at least two signals to at least two radiating elements of a phased array antenna, the phase shift increment being between the at least two radiating elements and determined to cause at least one of a constructive radiation intensity in a first direction and a destructive radiation intensity in a second direction upon radiation being emitted by the at least two radiation elements; and
    transmitting RF power from the phased array antenna to the electronic device, the RF power being transmitted via RF waves.

9. The method of claim 8, wherein the generating comprises generating by a synthesizer a digital frequency to be applied to the at least two electrical signals.

10. The method of claim 8 further comprising amplifying the at least two electrical signals.

11. The method of claim 8, wherein the shifting a phase occurs before the generating at least two electrical signals.

12. A system for providing power via Radio Frequency (RF) waves from a source to an electronic device located in a bounded area, the system comprising:
    a remote device powering module adapted to be connected to the source, the device comprising:
        a transmitter for transmitting RF power to the electronic device, the transmitter comprising:
            at least one connector for providing an electrical connection with the power source;
            a conversion circuit for converting power from the source to an electrical signal having a reference phase;
            a phase shifter module for shifting the reference phase of the electrical signal;
        a phased array antenna mounted to the transmitter and having a plurality of radiating elements adapted to transmit the electrical signal at a plurality of phases, the phase shifter module adapted to determine, prior to transmission of the electrical signal as RF power from the phased array antenna to the electronic device, a phase shift increment between at least a pair of the plurality of radiating elements to cause at least one of a constructive radiation intensity in a first direction and a destructive radiation intensity in a second direction upon radiation being emitted by the plurality of radiating elements, and to apply the phase shift increment to the reference phase of the electrical signal to create a shifted electrical signal provided to at least one of the at least pair of plurality of radiating elements; and a receiver connected to the electronic device for detecting the RF power transmitted by the transmitter and converting the RF power to direct current (DC) voltage to be provided to the electronic device.

13. The system of claim 12, wherein the transmitter comprises a synthesizer for generating a digital frequency for the electrical signal.

14. The system of claim 12, wherein the phase shifter module is connected to the synthesizer of the transmitter.

15. The system of claim 12, wherein the phase shifter module is a vector modulator.

16. The system of claim 12, wherein the transmitter comprises a plurality of amplifiers.

17. The system of claim 16, wherein each radiating element of the plurality of radiating element is connected to an amplifier of the plurality of amplifiers of the transmitter.

* * * * *